United States Patent [19]
James

[11] Patent Number: 4,753,173
[45] Date of Patent: Jun. 28, 1988

[54] PORTABLE TURNTABLE DEVICE

[76] Inventor: Stanley D. James, 35091 Hunt Club Rd., Gurnee, Ill. 60031

[21] Appl. No.: 765,458

[22] Filed: Aug. 14, 1985

Related U.S. Application Data

[63] Continuation-in-part of Ser. No. 563,236, Dec. 19, 1983, abandoned.

[51] Int. Cl.⁴ ............................................. B60S 13/02
[52] U.S. Cl. ...................................... 104/45; 104/44; 104/35
[58] Field of Search ...................... 104/35, 36, 38, 44, 104/45, 46; 246/428

[56] References Cited

U.S. PATENT DOCUMENTS

| | | | |
|---|---|---|---|
| 926,147 | 6/1909 | Slentz | 104/44 |
| 1,421,009 | 6/1922 | Inman | 104/46 |
| 1,640,982 | 8/1927 | Cresei | 104/44 X |
| 1,770,567 | 7/1930 | Bowen | 104/44 |
| 3,191,782 | 6/1965 | Pernum | 104/44 |
| 3,338,176 | 7/1965 | Peterson | 104/44 |
| 3,566,798 | 3/1971 | Peitzman | 104/46 X |
| 4,391,425 | 7/1983 | Keep, Jr. | 246/428 |

FOREIGN PATENT DOCUMENTS 247877 2/1926 United Kingdom .................. 104/45

Primary Examiner—Andres Kashnikow
Assistant Examiner—Frank Williams
Attorney, Agent, or Firm—A. R. Thiele

[57] ABSTRACT

A portable, sectioned, rotatable platform member has four distinct portions, a central portion, a substantially flat table portion, a curved apron portion, and an edge wall portion. The platform member is supported by vertical rotatable bearing surfaces which are positioned under the substantially flat table portion of the platform member. Additionally, horizontal, rotatable, guide surfaces are located under the platform member to position the platform member and allow for its free rotatability.

10 Claims, 4 Drawing Sheets

PORTABLE TURNTABLE DEVICE

This application is a continuation-in-part of Ser. No. 563,236 filed on Dec. 19, 1983, now abandoned.

BACKGROUND OF THE INVENTION

The present invention relates broadly to turntables, and more specifically to turntables which may be used for rotating vehicles, heavy equipment or displays.

In many settings, the space for placing and turning automobiles, airplanes or heavy machinery has limited available maneuver room. Difficulties associated with this space limitation situation are compounded when devices such as automobiles, airplanes or pieces of heavy machinery must either be oriented in a particular direction for operation or continuously rotated when on display at shows, conventions, expositions or similar events.

For example, an automobile may be oriented head first in a garage yet when it is removed from the garage it must then be turned around. Such situations may occur when the garage for the automobile is located at the bottom of an incline particularly when the incline may be ice or snow-covered as in a cold climate. Additionally, the need may also arise with narrow twisty driveways where driving in reverse is both hazardous and difficult. Also when parked closely adjacent to a roadway, it requires backing out onto that roadway before proceeding.

In yet another situation, airplanes typically do not have a powered reverse. In order to taxi them out of a hanger they must be turned around.

In still another situation, it may be necessary that heavy machinery, boats or other large items may be put on rotary display in order for viewers to observe all sides of the machine, vehicle or device. Such display turntables have not been readily available because of the great weight needed to support and counterbalance heavy equipment. The weight of such turntables contributes to their lack of portability. Such prior art turntables have themselves become major items of heavy equipment requiring solid foundations, accurate alignment, heavy installation equipment, skilled mechanics and the attendant great expense. Additionally, accurate positioning of the load on the turntable may be necessary for reliable operation.

There is therefore a need to provide an easy to use portable turntable whose operation is not hampered by the problems of weight, relative permanency or complexity of installation. Such a turntable should be easy to transport and easy to install on a variety of surfaces not requiring excavation, extensive leveling or surface preparation.

SUMMARY OF THE INVENTION

A portable turntable device has a substantially circular, sectioned and rotatable platform member. When the various sections of the rotatable platform member are assembled together, four distinct portions are produced. In the center is a central portion which may be domed or flat. Extending from the perimeter of the central portion is a table portion. Extending from the table portion is a curved apron portion and extending from the perimeter of the curved apron portion and forming the outer perimeter of the rotatable platform member is an edge wall portion. Supporting the rotatable platform member and allowing it to rotate freely are vertical, rotatable, load-bearing members, which are typically roller bearings positioned under the table portion of the platform member. Positioning the platform member with respect to the vertical support members are horizontally positioned guide bearings. In the preferred embodiment the guide bearings abut against a downwardly depending flange which is formed on the underside of the table portion of the platform rotatable member. For ease of assembly and reduction in cost, the guide bearings use standard roller bearings.

The portable turntable device of the present invention may also include a friction drive mechanism and a ramp for ease of access.

BRIEF DESCRIPTION OF THE DRAWINGS

A better understanding of the turntable device of the present invention may be had by reference to the accompanying drawings wherein.

DESCRIPTION OF THE PREFERRED EMBODIMENTS

Figure 1:
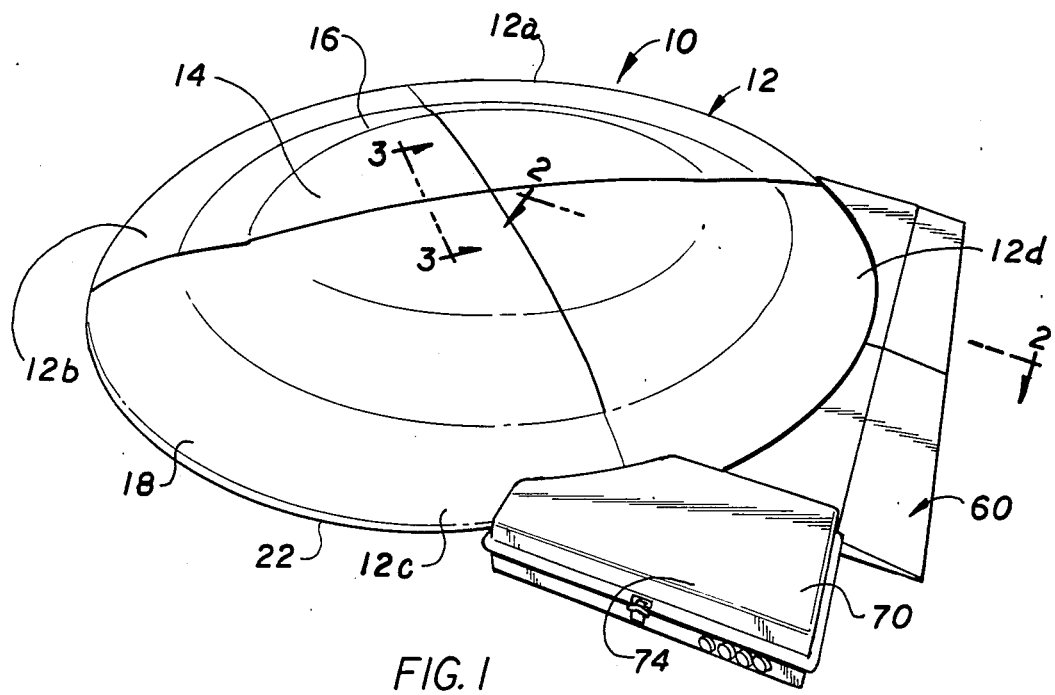
FIG. 1 is a perspective view of the preferred embodiment of the portable turntable device of the present invention.
Figure 2:
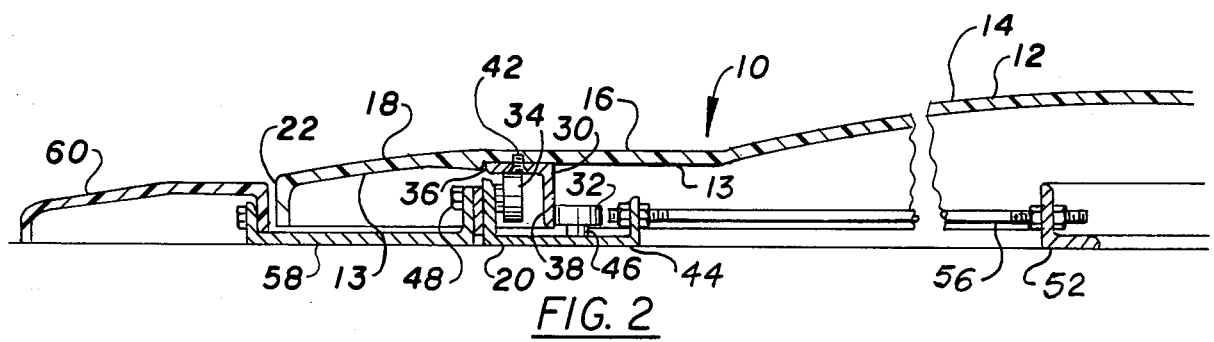
FIG. 2 is a sectional view taken along line 2—2 of FIG. 1.

As is best shown in FIGS. 1 and 2 the portable turntable device generally 10, of this invention consists of a substantially circular sectioned platform member 12 which is supported so that it is free to rotate slightly above the ground. When assembled, rotatable platform member 12 has four distinct portions. Although shown in four pie-shaped sections it will be understood that rotatable platform member 12 may either be formed as a single integral unit or if desired it may be formed from any number of sections.

In the center of the platform member 12 is a central portion 14. Formed around the perimeter of central portion 14 is table portion 16. Table portion 16 is designed to rest under the wheels or feet of the object which is placed on turntable device 10. Extending from the perimeter of table portion 16 is curved apron portion 18. Extending from perimeter of curved apron portion 18 in a downward manner is edge wall portion 22.

Figure 3:
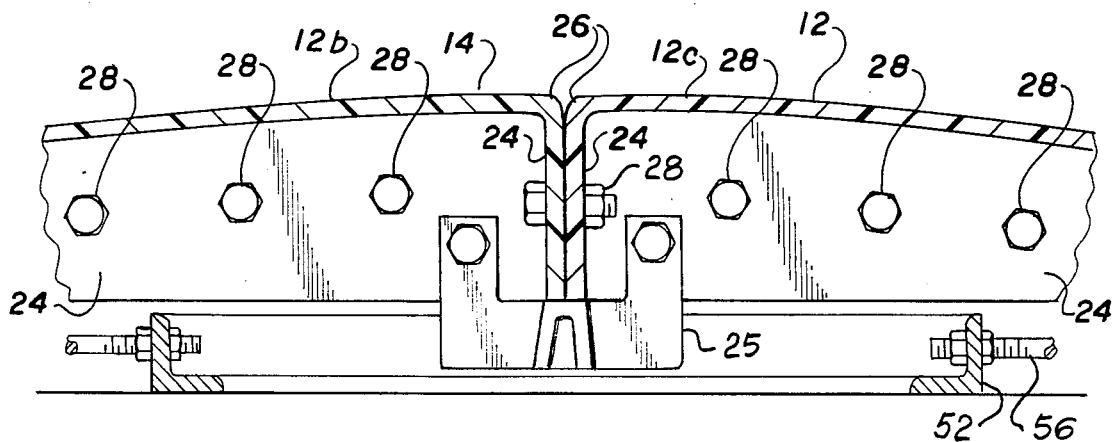
FIG. 3 is a sectional view taken along line 3—3 of FIG. 1.

In the preferred embodiment, platform member 12 is divided radially into four different pie-shaped sections 12a, 12b, 12c and 12d. Specifically it has been found that the dividing of platform member 12 into four pie-shaped sections 12a, 12b, 12c and 12d allows for convenient transportability as well as easy assembly and disassembly. As shown in FIG. 3 the assembly of the various pie-shaped sections 12a, 12b, 12c and 12d of platform member 12 is accomplished by the mating of downwardly depending flanges 24 formed on mating edges 26 of each pie-shaped section and the attachment of a plurality of threaded fastening devices 28 through holes in flanges 24. If desired rivets or bonding may be used in the place of fasteners 28 without affecting the operability of turntable device 10. It will be understood that if rivets or bonding material is used the ease of assembly and disassembly associated with the use of fasteners 28 will be severely limited. Additionally, an overload column 25, whose operation will be explained below, is shown connected to sections 12a and 12d in the preferred embodiment.

Figure 4:
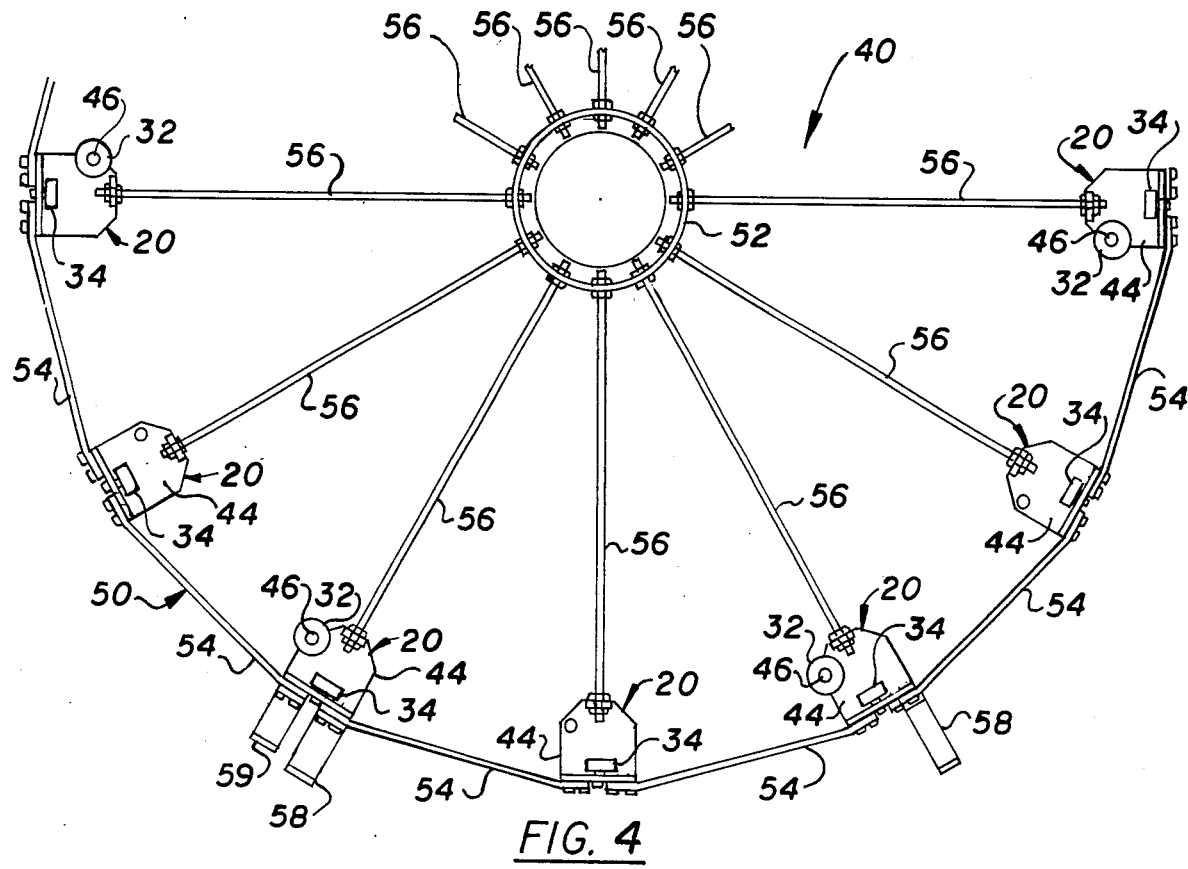
FIG. 4 is a partial plan view of the undercarriage of the portable turntable device.
Figure 4A:
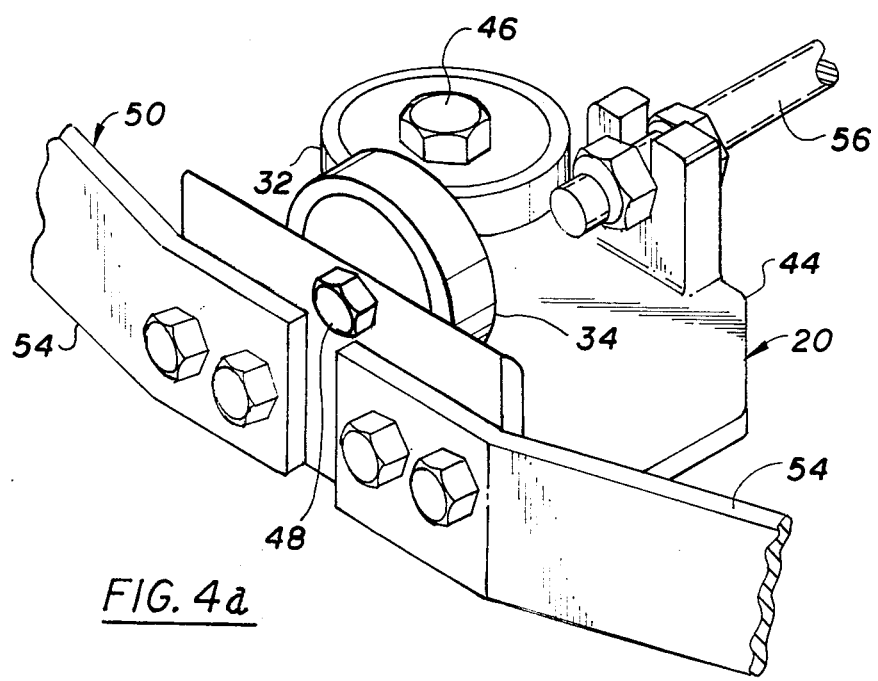
FIG. 4a is an enlarged perspective view of one section of the undercarriage shown in FIG. 4.

As best seen in FIGS. 2 and 4a, individual mounting assembly 20 consists of a horizontal, guide bearing 32 and a vertical, load-bearing bearing 34. Both horizontal and vertical bearings 32 and 34 respectively, are located underneath platform member 12. In the preferred embodiment vertical, load-bearing surfaces 34 are in contact with horizontal leg 36 of circular angle ring 30 which is attached to the underside 13 of table portion 16 of rotatable platform member 12. While a threaded fastener 42 is shown in the preferred embodiment, it will be understood that any suitable means of fastening may be employed for attachment of angle ring 30 to the underside 13 of the rotatable platform member 12. Horizontal, guide bearing 32 are in contact with vertical leg 38 of angle ring 30 and provide lateral alignment of platform member 12. If desired, angle ring 30 may be replaced with an integrally formed flange and pad formed into the underside 13 of platform member 12.

In the preferred embodiment both vertical load-bearing member 34 and the horizontal guide bearing 32 are colocated on base plate 44. Horizontal, guide bearing 32 is located on support post 46 and vertical, load-bearing member is located on support arm 48. As shown in FIG. 4, not all mounting assemblies 20 need have both horizontal surface 32 and vertical load bearing surface 34.

Positioning of each individual mounting assembly 20 on a specially prepared or leveled surface is not critical to the operation of the turntable system 10. It has been found that turntable system 10 can be utilized with individual mounting assemblies 20 on uneven surfaces such as sod or an unprepared dirt or uneven concrete floor.

Base plates 44 are properly located for receipt of the platform member 12 by connecting them together into an undercarriage assembly 40 as shown in FIG. 4. Herein a center ring 52 acts as a hub for spoke-like members 56 which attach to base plates 44. Further positioning and orienting of base plates 44 is accomplished by the use of connector sections 54 which when attached to base plates 44 form outer ring 50.

To further enhance the usability of turntable device 10 ramp assembly 60 may be placed adjacent edge wall 22 of turntable device 10. As shown in FIGS. 2 and 4 ramp assembly 60 may be attached to outer ring 50 of undercarriage assembly 40 by the tie pieces 58.

Figure 5:
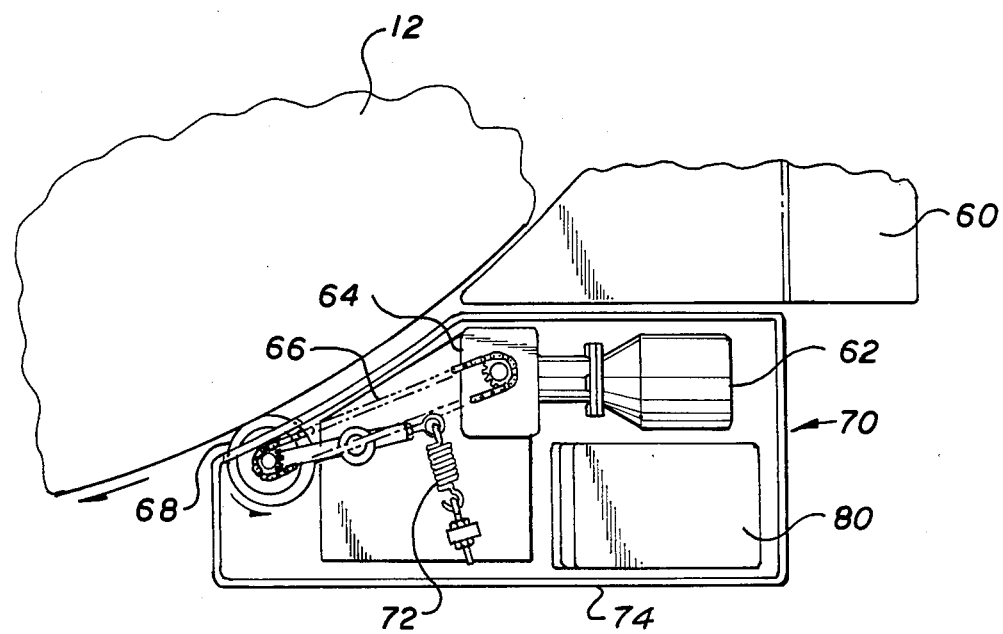
FIG. 5 is a plan view of the drive system.

A friction drive system 70 such as shown in FIG. 5 may also be located on the edge of platform member 12. The friction drive system 70 is used to rotate platform member 12 with electric motor 62. As shown in FIG. 4 separate tie piece 59 may be used to position drive assembly 70. It will be understood that the inclusion of a friction drive system 70 is not necessary for operation of device 10 as platform member 12 is freely rotatable when supported on individual mounting assemblies 20.

If desired, mechanical or electrical sensors (not shown) may be used as stops for drive system 70 under platform member 12 to indicate when platform member 12 has been rotated 90°, 180°, or 360°, or if desired the sensors or stops can be placed at any convenient or desired angular interval.

Additionally, electrical heating strips (not shown) may be employed on underside 13 of platform member 12 if device 10 is to be used in cold climates or there is a chance of ice or snow accumulating on platform member 12.

OPERATION OF THE DEVICE

The user of portable turntable device 10 of the present invention will normally receive rotatable platform member 12 as individual pie-shaped sections 12a, 12b, 12c and 12d. Additional components will also be received as individual pieces. The bolt together construction of platform member 12 and undercarriage 40 allows for ease of assembly, transport and disassembly of portable turntable device 10.

Figure 6:
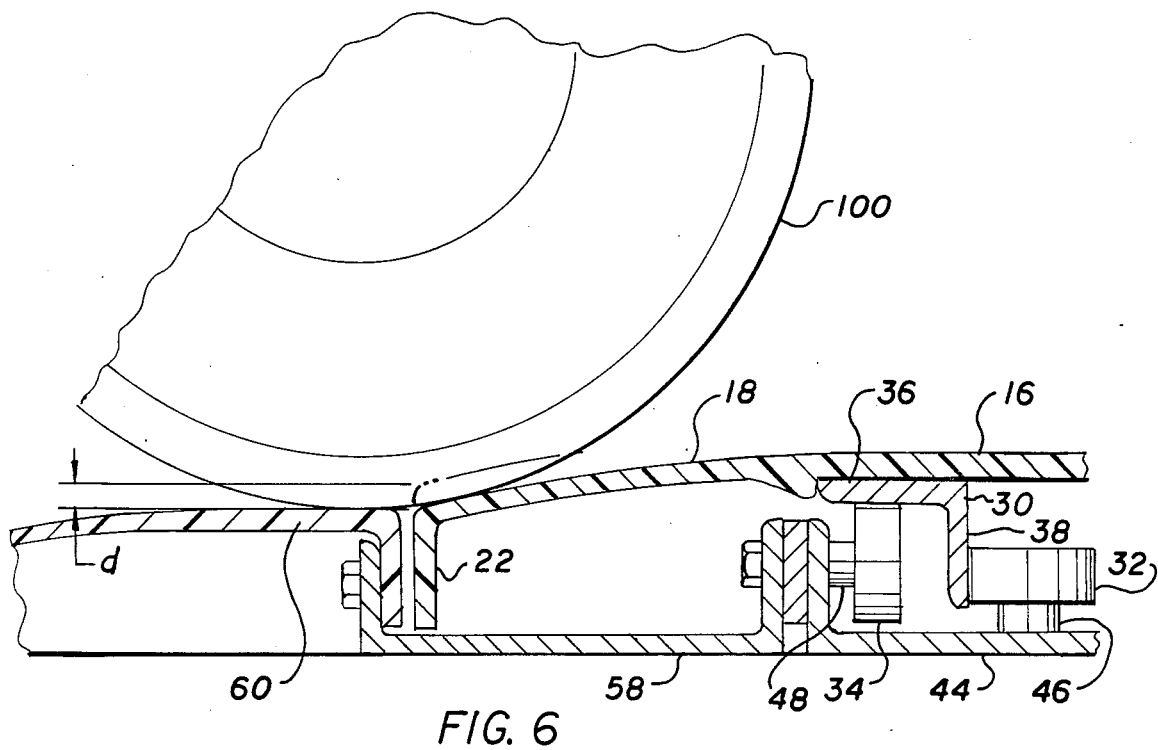
FIG. 6 is a side view in partial section, showing the effect of a vehicle on the deflection of the platform member.

Once assembled, If a vehicle or a piece of heavy machinery is to be used with turntable device 10 of the present invention it is preferable to use ramp 60 near edge wall portion 22 of platform member 12. However, ramp 60 is not necessary for utilization of device 10. As can be seen in FIG. 6, the driving of an automobile onto turntable device 10 of the present invention is illustrative of the benefits of the division of assembled platform member 12 into four portions. As the wheel of an automobile 100 first contacts curved apron portion 18 of platform member 12, curved apron portion 18 bends as a cantilever beam from the table portion 16 of platform member 12. In FIG. 6 deflection "d" illustrates the movement of curved apron portion 18 under the weight of an automobile tire 100. This cantilever action of curved apron portion 18 is assured by the increased thickness of table portion 16 with respect to curved apron portion 18. This cantilever bending of curved apron portion 18 is particularly critical as device 10 in its preferred embodiment is formed of flexible fiberglass. Were platform member 12 not formed to bend as shown in FIG. 6, platform member 12 would tip up or rise off its supports each time a vehicle were driven onto turntable device 10. Because of the deflection "d" and the remaining mass of rotatable platform member 12 the unequal loading associated with rolling a vehicle on and off platform member 12 will not cause platform member 12 to become misaligned on undercarriage 40. As the vehicle moves further onto platform member 12, the weight of the vehicle is then spread over various individual mounting assemblies 20 located underneath table portion 16 of platform member 12. As the vehicle's wheel 100 moves over curved apron portion 18 and onto table portion 16 the driver will feel a noticeable leveling of the vehicle. This leveling will signal the driver that his vehicle is properly located on platform member 12.

If the vehicle is too heavy for platform member 12, load column 25 will come into contact with the floor or ground on which device 10 rests thus preventing destruction of rotatable member member 12. Contact between load column 25 and the floor or ground will prevent rotation of platform member 12 in this overstressed condition. Load column 25 may also contain an internally threaded bore (not shown) which is sized to receive a threaded eyebolt passed through a hole which can be formed at the point where pie-shaped sections 12a, 12b, 12c and 12d come together. In this manner assembled platform member 12 may be lifted as a unit off undercarriage 40 for repair, cleaning or lubrication of undercarriage 40.

In the preferred embodiment central portion 14 of platform member 12 is domed. If the vehicle is misaligned the dome will give the driver notice of being off table portion 16. The unique shape of platform member 12 also allows for self drainage and protection of undercarriage 40 if device 10 is used in wet weather. For additional traction platform member 12 may be coated with a rough or gripper-textured coating surface. When device 10 is rotated, horizontal bearings 32 come into contact with the angle ring 30 located on the underside 13 of the platform member 12 thus allowing platform member 12 to rotate in a circular concentric fashion.

Figure 7:
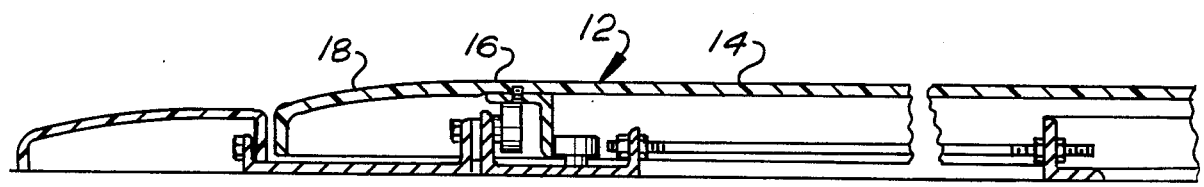
FIG. 7 is a sectional view of an alternate embodiment of the device of the present invention.

As shown in FIG. 7 platform member 12 may be constructed without a dome in central portion 14. Such construction is particularly useful for support and rotation of light displays or machines.

The friction drive system 70 as shown in FIG. 5, consists of a motor 62, a gear reduction unit 64, a sprocket and chain drive 66 and a friction wheel 68. A spring tensioner 72 keeps friction wheel 68 in contact with edge wall 22 of platform member 12. If desired, radio controls, overload circuitry and electrical reversing may be built into a motor control software package 80. A ⅛ HP motor 62 and a 60:1 gear reduction unit 64 driving a high density urethane coated friction wheel 68 have provided satisfactory results. A housing 74 may be used to contain and protect the drive system 70 and software package 80.

It will be seen that detailed positioning of the vertical load-bearing surface 34 and horizontal guide surface 32 is not extremely critical to proper device operation. All vertical surfaces 34 and horizontal surfaces 32 need not be in contact with their mating surfaces at any one time for proper device 10 operation. A minimum of three vertical load-bearing surfaces 34 in contact with the angle ring 30 has given satisfactory results.

Typically, platform member 12 is made from a composite fiberglass construction. It has been shown that when fiberglass is used to form the platform member 12 the various pie-shaped sections 12a, 12b, 12c and 12d of platform member 12 are easily manipulated by two men and attached to one another with common threaded fasteners 28.

Surfaces 32 and 34 may typically be the external portions of a roller or ball bearing however any standard low friction bearing may be used.

It is now understood that by the present invention there is provided a turntable device 10 which does not require critical positioning of a load, accurate alignment, special foundations, heavy installation equipment or skilled mechanics and thus provides a readily portable system for easy rotation of a load.

A person skilled in the art will realize that modifications may be made to the disclosed invention and that such modifications will not depart from the spirit and scope of the disclosed invention.

What is claimed is:

1. A portable turntable device for vehicles or the like comprising:
    a substantially circular platform member having:
    (i) means for giving a driver of the vehicle or the like notice of being misaligned with said substantially circular platform memer, said means for giving notice to the driver including an integral substantially dome-shaped central portion;
    (ii) a table portion for the support of weight extending from the perimeter of said substantially dome-shaped central portion;
    (iii) a cantilevered apron portion extending from the perimeter of said substantially flat weight supporting table portion, said cantilevered apron portion constructed and arranged to deflect by an amount sufficient to allow the motor vehicle or the like to be driven onto said weight supporting table portion; and
    (iv) an edge wall portion depending downwardly from the perimeter of said cantileverd apron portion; and
    means to support said substantially circular platform member located under said substantially circular platform member, said support means having:
    (i) at least three substantially vertical load-bearing surfaces in contact with the underside of said weight supporting table portion of said substantially circular platform member, said substantially vertical load-bearing surfaces being rotatable about a substantially horizontal axis; and
    (ii) a plurality of substantially horizontal guide surfaces for lateral alignment of said substantially circular platform member, said substantially horiozntal guide surfaces being rotatable about a substantially vertical axis.

2. The portable turntable device as defined in claim 1 wherein said substantially circular platform member is further defined as having at least two separate pie-shaped sections.

3. The portable turntable device as defined in claim 2 wherein said substantially circular platform member includes means to connect said pie-shaped sections located on downwardly depending flanges extending from the underside of said substantially circular platform member.

4. The portable turntable device as defined in claim 2 wherein said substantially circular platform member is made of fiberglass.

5. A portable turntable device for vehicles or the like comprising:
    a substantially circular platform member having:
    (i) means for giving a driver of the vehicle or the like notice of being misaligned with said substantially circular platform member, said means for giving notice to the driver including an integral substantially dome-shaped central portion;
    (ii) a table portion for the support of weight extending from the perimeter of said substantially dome-shaped central portion;
    (iii) a cantilevered apron portion extending from the perimeter of said substantially flat weight supporting table portion, said cantilevered apron portion constructed and arranged to deflect by an amount sufficient to allow the motor vehicle or the like to be driven onto said weight supporting table portion; and
    (iv) an edge wall portion depending downwardly from the perimeter of said cantilevered apron portion; and
    means to support said substantially circular platform member located under said substantially circular platform member, said support means including:
    (i) a base member;
    (ii) a substantially vertical load-bearing surface mounted on said base member in contact with the underside of said weight supporting table portion of said substantially circular platform member, said substantially vertical load-bearing surface being rotatble about a substantially horizontal axis;

(iii) a substantially horizontal guide member located on said base for lateral alignment of said substantially circular platform member, said substantially horizontal guide member being rotatable about a substantially axis.

6. The portable turntable device as defined in claim 5 wherein said substantially vertical load-bearing surface is a roller bearing.

7. The portable turntable device as defined in claim 5 wherein said substantially horizontal guide member is a roller bearing.

8. The portable turntable device as defined in claim 5 further including means to rotate said substantially circular platform member.

9. A portable turntable system comprising:
a substantially cicular platform member having:
(i) an integral substantially dome-shaped central portion;
(ii) a table portion for the support of weight extending from substantially dome-shaped central portion;
(iii) a cantilevered apron portion extending from the perimeter of said weight suppoting table portion, said cantilevered apron portion flexing as a cantilevered beam when a heavy object is rolled on or off said substantially circular platform member; and
(iv) an edge wall portion extending from said cantilevered apron portion; and means to support said substantially circular platform member located under said substantially circular platform member, said support means having;
(i) at least three substantially vertical, load-bearing surfaces in contact with the underside of said weight supporting table portion of said substantially circular platform member; and
(ii) a plurality of substantially horizontal guide surfaces in contact with a flange member which depends from the underside of said weight supporting table portion of said substantially circular platform member, said substantially horizontal guide surfaces being rotoatable about a substantially vertical axis.

10. The portable turntable system as defined in claim 9 further including means to rotate said substantially circular platform member.

* * * * *